United States Patent
Vishin et al.

(10) Patent No.: US 7,721,127 B2
(45) Date of Patent: May 18, 2010

(54) MULTITHREADED DYNAMIC VOLTAGE-FREQUENCY SCALING MICROPROCESSOR

(75) Inventors: Sanjay Vishin, Sunnyvale, CA (US); Russell W. Bell, Morrisville, NC (US)

(73) Assignee: MIPS Technologies, Inc., Mountain View, CA (US)

( * ) Notice: Subject to any disclaimer, the term of this patent is extended or adjusted under 35 U.S.C. 154(b) by 912 days.

(21) Appl. No.: 11/391,716

(22) Filed: Mar. 28, 2006

(65) Prior Publication Data

US 2007/0234091 A1 Oct. 4, 2007

(51) Int. Cl.
G06F 1/26 (2006.01)
(52) U.S. Cl. .......................... 713/322; 712/231; 718/102
(58) Field of Classification Search .................. 713/322; 712/231; 718/102
See application file for complete search history.

(56) References Cited

U.S. PATENT DOCUMENTS

| | | | |
|---|---|---|---|
| 2003/0028816 A1 | 2/2003 | Bacon | |
| 2005/0132238 A1* | 6/2005 | Nanja | 713/300 |
| 2005/0149936 A1* | 7/2005 | Pilkington | 718/102 |
| 2006/0179194 A1 | 8/2006 | Jensen | |
| 2006/0179274 A1 | 8/2006 | Jones et al. | |
| 2006/0179276 A1 | 8/2006 | Banerjee et al. | |
| 2006/0179279 A1 | 8/2006 | Jones et al. | |
| 2006/0179280 A1 | 8/2006 | Jensen et al. | |
| 2006/0179281 A1 | 8/2006 | Jensen et al. | |
| 2006/0179283 A1 | 8/2006 | Jensen | |
| 2006/0179284 A1 | 8/2006 | Jensen et al. | |
| 2006/0179439 A1 | 8/2006 | Jones et al. | |
| 2006/0206692 A1 | 9/2006 | Jensen | |
| 2006/0236135 A1* | 10/2006 | Jones | 713/300 |
| 2006/0236136 A1 | 10/2006 | Jones | |
| 2007/0113053 A1 | 5/2007 | Jensen et al. | |

FOREIGN PATENT DOCUMENTS

EP 1351117 8/2003

OTHER PUBLICATIONS

Pillai et al., "Real-Time Dynamic Voltage Scaling for Low-Power Embedded Operating Systems." 18th Symposium on Operating Systems Principles, Association of Computing Machinery, 2001. Downloaded from http://sosp.org/2001/papers/pillai.pdf on Jan. 13, 2007.

(Continued)

Primary Examiner—Albert Wang
(74) Attorney, Agent, or Firm—Sterne, Kessler, Goldstein & Fox PLLC

(57) ABSTRACT

A multithreaded microprocessor includes a thread scheduler and voltage-frequency scheduler (VFS). The thread scheduler uses application-specified QoS requirements, which include required instruction completion rates, and instruction completion information from execution units to schedule the priorities of the threads at which the thread scheduler issues instructions to the execution units. Concurrently, the VFS uses the instruction completion and QoS information to calculate an aggregate utilization of the microprocessor by all the active threads when it is time to scale the voltage-frequency. The aggregate utilization is an effective measure of the amount of work left to be performed relative to the rate requirements. The VFS scales the voltage-frequency based on the aggregate utilization.

46 Claims, 7 Drawing Sheets

OTHER PUBLICATIONS

Bobrov et al. "i.MX31 and i.MX31L Power Management White Paper." Freescale Semiconductor, Inc. Rev.0.0. Document No. IMX31POWERWP. Jun. 2005.

Burd et al. "Design Issues for Dynamic Voltage Scaling." Berkeley Wireless Research Center. University of California, Berkeley. 2000. pp. 9-14.

Meijer et al. "Technology Exploration for Adaptive Power and Frequency Scaling in 90nm CMOS." Philips Research Laboratories. Eindhoven, The Netherlands. 2004. pp. 14-19.

Lackey et al. "Managing Power and Performance for System-on-Chip Designs using Voltage Islands." IBM Microelectronics Division, Essex Junction, Vermont 05452, USA. 2002 IEEE. pp. 195-202.

Xie et al. "Intraprogram Dynamic Voltage Scaling: Bounding Opportunities with Analytic Modeling." ACM Transactions on Architecture and Code Optimization, vol. 1, No. 3, Sep. 2004, pp. 323-367.

Martin et al. "Combined Dynamic Voltage Scaling and Adaptive Body Biasing for Lower Power Microprocessors under Dynamic Workloads." 2002 IEEE. pp. 721-725.

Pouwelse et al. "Dynamic Voltage Scaling on a Low-Power Microprocessor." UbiCom Technical Report. 2000. pp. 1-8. Delft University of Technology, The Netherlands.

Sharma et al. "Power-aware QoS Management in Web Servers." Proceedings of the 24$^{th}$ IEEE International Real-Time Systems Symposium (RTSS'03). 2003 IEEE. pp. 1-10.

Meijer, M. et al., "On-Chip Digital Power Supply Control for System-on-Chip Applications," *ISLPED'05 — Proc. Of the 2005 Intl. Symp. On Low Power Electronics and Design,* San Diego California, USA, pp. 311-314, Aug. 8-10, 2005.

\* cited by examiner

MULTITHREADED DYNAMIC VOLTAGE-FREQUENCY SCALING MICROPROCESSOR

FIELD OF THE INVENTION

The present invention relates in general to the field of multithreaded microprocessors, and particularly to low energy consumption thereby.

BACKGROUND OF THE INVENTION

Microprocessor designers employ many techniques to increase microprocessor performance. Most microprocessors operate using a clock signal running at a fixed frequency. Each clock cycle, the circuits of the microprocessor perform their respective functions. According to Hennessy and Patterson (see *Computer Architecture: A Quantitative Approach*, 3rd Edition), the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. Large performance increases have been realized by architectural and organizational notions that improve the instructions per clock cycle, in particular by notions of parallelism.

One notion of parallelism that has improved the clock frequency of microprocessors is pipelining, which overlaps execution of multiple instructions within pipeline stages of the microprocessor. In an ideal situation, each clock cycle one instruction moves down the pipeline to a new stage, which performs a different function on the instruction. Thus, although each individual instruction takes multiple clock cycles to complete, the multiple cycles of the individual instructions overlap. Because the circuitry of each individual pipeline stage is only required to perform a small function relative to the sum of the functions required to be performed by a non-pipelined processor, the clock cycle of the pipelined processor may be reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle. These microprocessors are commonly referred to as superscalar microprocessors.

What has been discussed above pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams of instructions, commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or contexts, for storing the unique state of each thread, such as multiple program counters and general purpose register sets, to facilitate the ability to quickly switch between threads to fetch and issue instructions. In other words, because each thread context has its own program counter and general purpose register set, the multithreading microprocessor does not have to save and restore these resources when switching between threads, thereby potentially reducing the average number of clock cycles per instruction.

One example of a performance-constraining issue addressed by multithreading microprocessors is the fact that accesses to memory outside the microprocessor that must be performed due to a cache miss typically have a relatively long latency. It is common for the memory access time of a contemporary microprocessor-based computer system to be between one and two orders of magnitude greater than the cache hit access time. Instructions dependent upon the data missing in the cache are stalled in the pipeline waiting for the data to come from memory. Consequently, some or all of the pipeline stages of a single-threaded microprocessor may be idle performing no useful work for many clock cycles. Multithreaded microprocessors may solve this problem by issuing instructions from other threads during the memory fetch latency, thereby enabling the pipeline stages to make forward progress performing useful work, somewhat analogously to, but at a finer level of granularity than, an operating system performing a task switch on a page fault. Other examples of performance-constraining issues addressed by multithreading microprocessors are pipeline stalls and their accompanying idle cycles due to a data dependence; or due to a long latency instruction such as a divide instruction, floating-point instruction, or the like; or due to a limited hardware resource conflict. Again, the ability of a multithreaded microprocessor to issue instructions from independent threads to pipeline stages that would otherwise be idle may significantly reduce the time required to execute the program or collection of programs comprising the threads.

The need for increased performance by microprocessors has developed in parallel with the need for reduced energy consumption by microprocessors and the systems that contain them. For example, portable devices—such as laptop computers, cameras, MP3 players and a host of others—employ batteries as an energy source in order to facilitate their portability. It is desirable in these types of devices to reduce their energy consumption in order to lengthen the amount of time between battery re-charging and replacement. Additionally, the need for reduced energy consumption has been observed in large data centers that include a high concentration of server computers and network devices in order to reduce device failure and energy costs.

A significant technique that has been employed to reduce energy consumption is what is commonly referred to as dynamic voltage scaling (DVS). The active power consumption of most microprocessors is the product of the collective switching capacitance (C), the switching frequency (f), and the supply voltage ($V_{DD}$) of the microprocessor, or $P=C*f*V^2_{DD}$. Thus, lowering the voltage has the greatest effect on lowering the power consumption of the microprocessor. However, lowering the voltage increases the propagation delay of signals within the microprocessor. Thus, as the voltage is decreased, the frequency must also be decreased to enable the microprocessor to function properly. Reducing the frequency also reduces the power consumption; however, it also reduces the performance of the microprocessor. DVS attempts to dynamically scale down the voltage and frequency of the microprocessor during periods in which it is acceptable for the microprocessor to perform at a lower level, and to scale up the voltage and frequency during periods in which higher performance is needed.

It has been noted that, with many applications, the performance required of the microprocessor may vary relatively widely and frequently. Stated alternatively, the applications may utilize the processing power of the microprocessor relatively fully for periods intermixed with periods in which the applications utilize the processing power relatively sparingly. The length of the periods between which the utilization changes significantly may be relatively short, such as on the order of hundreds of nanoseconds. Thus, the finer the granularity at which a DVS implementation can scale the voltage-frequency, the potentially larger the energy savings that may be realized. Otherwise, much potential energy savings is lost due to the coarseness of the granularity.

However, the voltage-frequency scaling granularity has historically been limited by the time required for the power supply to change the operating voltage, which has typically been on the order of hundreds of microseconds. DVS has been typically implemented thus far in software. That is, the system software controls the voltage and frequency scaling. The granularity of software implementations of DVS has been commensurate with the historically large voltage changing times. However, current power supply trends, such as fast on-chip voltage converters, and the notion of voltage islands promise to reduce the time in the near future to on the order of hundreds of nanoseconds. At that point, software DVS solutions that were fast enough for the larger voltage changing times will become too slow to take advantage of the smaller voltage changing times.

First, the software DVS solutions typically involve multiple layers, including one or more calls to the operating system, which typically involves switches in and out of a privileged execution mode, requiring large amounts of time relative to the fast voltage changing times. Second, since the DVS software consists of program instructions that must be executed by the microprocessor, the DVS software is actually increasing the performance demand on the microprocessor, and further, is consuming processor bandwidth that could be used by the application programs running on the microprocessor. To take advantage of the fine-grained voltage switching times anticipated in near future, it appears that software DVS solutions would have to use up an even larger percentage of the microprocessor bandwidth than they do currently.

Therefore, what is needed is a voltage-frequency scaling scheme for a multithreaded microprocessor that is capable of taking advantage of the potential energy savings that may be achieved by fine-grained voltage-frequency changes.

BRIEF SUMMARY OF INVENTION

The present invention provides a multithreaded microprocessor that includes a fine-grained voltage-frequency scheduler that works synergistically with a thread scheduler of the microprocessor. The voltage-frequency scheduler operates concurrently with the other functional units of the microprocessor, such as the instruction fetcher, instruction decoder, thread scheduler, and execution units, rather than utilizing them. Because the voltage-frequency scheduler is embodied in hardware of the microprocessor, it advantageously does not take away bandwidth of the functional units from executing application program instructions. Furthermore, the voltage-frequency scheduler is capable of scaling the voltage-frequency within a small number of clock cycles, if so specified by the system software, thereby enabling aggressive voltage-frequency scaling schemes by following rapid variations in processor utilization. Each voltage-frequency scaling period, the voltage-frequency scheduler calculates the aggregate utilization of the microprocessor by all the active threads based on application-specified quality-of-service requirements and instruction completion information supplied by the execution units. The application-specified quality-of-service requirements include required instruction completion rates, which the thread scheduler uses, along with the instruction completion information, to assign instruction issuance priorities to the multiple threads. The aggregate utilization is effectively a measure of the amount of work left to be performed relative to the rate requirements. The microprocessor may be included in a system, such as a system-on-chip, to reduce the energy consumption of the system as a whole.

In one aspect, the present invention provides a multithreaded microprocessor. The microprocessor includes a plurality of thread contexts, each configured to store application-specified quality-of-service (QoS) information for a corresponding plurality of threads concurrently executed by the microprocessor. The microprocessor also includes an indicator that indicates instruction completion information that specifies which of the plurality of thread contexts the microprocessor completed an instruction for. The microprocessor also includes a thread scheduler, coupled to the plurality of thread contexts and the indicator, that schedules instructions of the plurality of thread contexts to issue to execution units of the microprocessor based on the QoS information and the instruction completion information. The microprocessor also includes a voltage-frequency scheduler, coupled to the plurality of thread contexts and the indicator, that determines an aggregate utilization of the microprocessor by the plurality of threads based on the QoS information and the instruction completion information during a first period while the microprocessor is operating at a first frequency and voltage. The voltage-frequency scheduler also causes the microprocessor to operate at a second frequency and voltage during a second period based on the aggregate utilization. The second frequency and voltage are different from the first frequency and voltage.

In another aspect, the present invention provides a method for reducing energy consumption by a multithreaded microprocessor. The method includes storing an instruction completion rate in the microprocessor for each of a plurality of threads being concurrently executed thereby. An application comprising the thread requests completion of instructions at the rate to accomplish a desired quality-of-service. The method also includes operating the microprocessor during a first period at a first frequency and voltage. The method also includes indicating each clock cycle which of the plurality of threads the microprocessor completed an instruction for. The method also includes prioritizing the plurality of threads for issuance of instructions to execution units of the microprocessor based on the required instruction completion rates and the indicating. The method also includes calculating an aggregate utilization of the microprocessor by the plurality of threads during the first period based on the instruction completion indicating relative to the required rates. The method also includes operating the microprocessor during a second period at a second frequency and voltage based on the calculated aggregate utilization. The second frequency and voltage are different from the first frequency and voltage.

In another aspect, the present invention provides a computing system for operating at reduced energy consumption. The system includes a voltage regulator that receives a constant input voltage and supplies a variable voltage output in response to a first control signal. The system also includes a clock divider that receives a constant frequency input clock signal and supplies a variable frequency clock signal output in response to a second control signal. The system also includes a multithreaded microprocessor, coupled to receive the variable voltage output from the voltage regulator, and coupled to receive and operate at the variable frequency clock signal output. The microprocessor includes a plurality of thread contexts, each storing application-specified quality-of-service (QoS) information for a corresponding plurality of threads concurrently executed by the microprocessor. The microprocessor also includes an indicator that indicates instruction completion information specifying for which of the plurality of thread contexts the microprocessor completed an instruction. The microprocessor also includes a thread scheduler, coupled to the plurality of thread contexts and the indicator, that schedules instructions of the plurality of thread contexts to issue to execution units of the microprocessor based on the QoS information and the instruction completion information. The microprocessor also includes a voltage-frequency scheduler, coupled to the plurality of thread contexts and the indicator, that determines an aggregate utilization of the microprocessor by the plurality of threads based on the QoS information and the instruction completion information during a first period while generating the first and second control signals to cause the voltage regulator to supply a first voltage on the variable voltage output and to cause the clock divider to supply a first frequency on the variable frequency clock signal output. The voltage-frequency scheduler also generates the first and second control signals during a second period to cause the voltage regulator to supply a second voltage on the variable voltage output and to cause the clock divider to supply a second frequency on the variable frequency clock signal output. The second frequency and voltage are different from the first frequency and voltage.

In another aspect, the present invention provides a computer program product for use with a computing device, the computer program product including a computer usable medium, having computer readable program code embodied in the medium, for causing a multithreaded microprocessor. The computer readable program code includes first program code for providing a plurality of thread contexts, each configured to store application-specified quality-of-service (QoS) information for a corresponding plurality of threads concurrently executed by the microprocessor. The computer readable program code also includes second program code for providing an indicator for indicating instruction completion information specifying for which of the plurality of thread contexts the microprocessor completed an instruction. The computer readable program code also includes third program code for providing a thread scheduler, coupled to the plurality of thread contexts and the indicator, configured to schedule instructions of the plurality of thread contexts to issue to execution units of the microprocessor based on the QoS information and the instruction completion information. The computer readable program code also includes fourth program code for providing a voltage-frequency scheduler, coupled to the plurality of thread contexts and the indicator, configured to determine an aggregate utilization of the microprocessor by the plurality of threads based on the QoS information and the instruction completion information during a first period while the microprocessor is operating at a first frequency and voltage, and to cause the microprocessor to operate at a second frequency and voltage during a second period based on the aggregate utilization. The second frequency and voltage are different from the first frequency and voltage.

In another aspect, the present invention provides a method for providing a multithreaded microprocessor. The method includes providing computer-readable program code describing the multithreaded microprocessor. The computer readable program code includes first program code for providing a plurality of thread contexts, each configured to store application-specified quality-of-service (QoS) information for a corresponding plurality of threads concurrently executed by the microprocessor. The computer readable program code also includes second program code for providing an indicator for indicating instruction completion information specifying for which of the plurality of thread contexts the microprocessor completed an instruction. The computer readable program code also includes third program code for providing a thread scheduler, coupled to the plurality of thread contexts and the indicator, configured to schedule instructions of the plurality of thread contexts to issue to execution units of the microprocessor based on the QoS information and the instruction completion information. The computer readable program code also includes fourth program code for providing a voltage-frequency scheduler, coupled to the plurality of thread contexts and the indicator, configured to determine an aggregate utilization of the microprocessor by the plurality of threads based on the QoS information and the instruction completion information during a first period while the microprocessor is operating at a first frequency and voltage, and to cause the microprocessor to operate at a second frequency and voltage during a second period based on the aggregate utilization. The second frequency and voltage are different from the first frequency and voltage. The method also includes transmitting the computer-readable program code as a computer data signal on a network.

DETAILED DESCRIPTION

Figure 1:
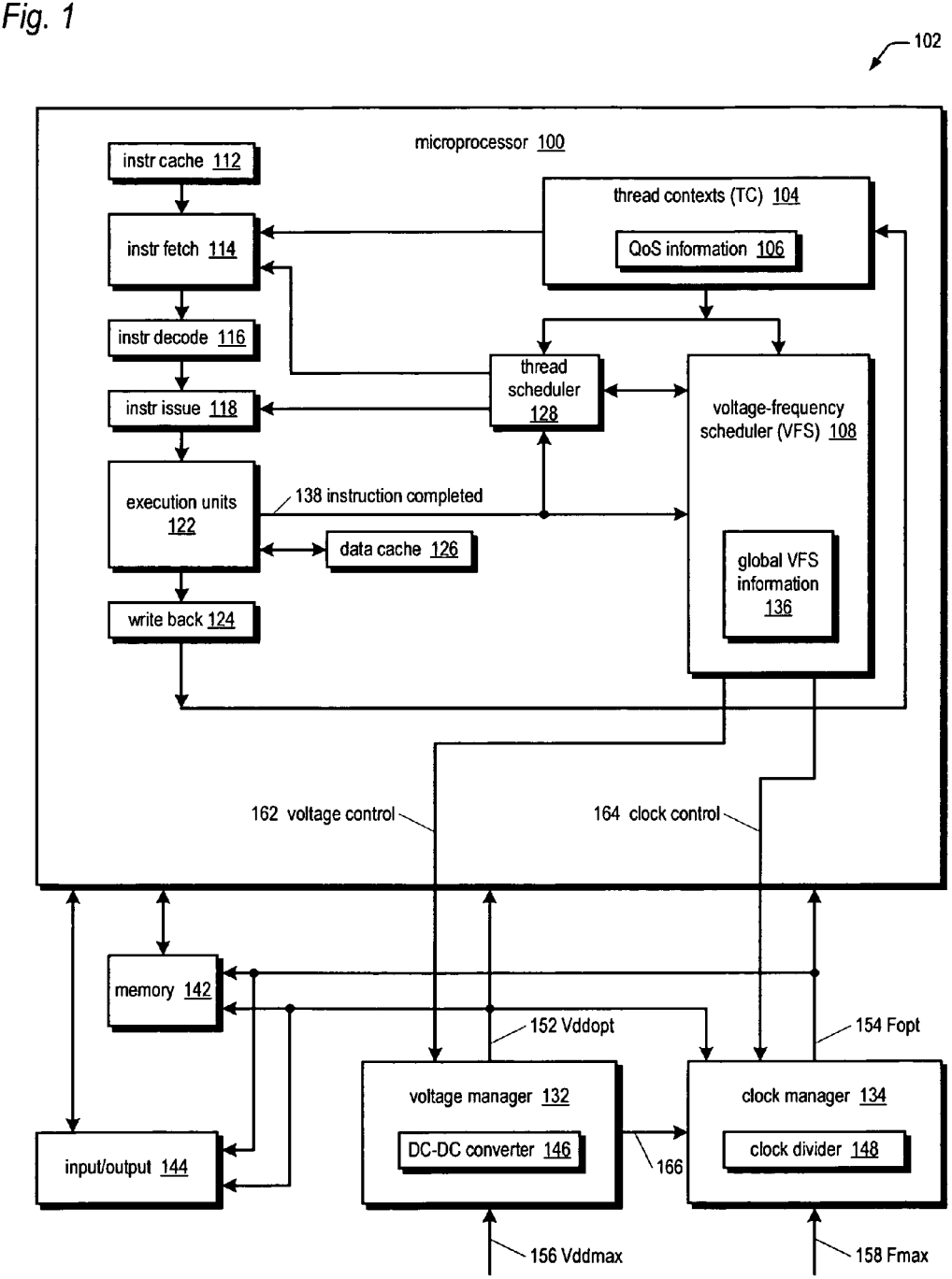
FIG. 1 is a block diagram illustrating a computing system, according to the present invention.

Referring now to FIG. 1, a block diagram illustrating a computing system 102 according to the present invention is shown. The system 102 comprises a microprocessor 100 coupled to a system memory 142, input/output devices 144, a voltage manager 132, and a clock manager 134. In one embodiment, the elements of the system 102 are integrated onto a common substrate, which may be commonly referred to as a system-on-chip. The system 102 may be employed in a general purpose computing system, such as a desktop, laptop, handheld, or server computer. The system 102 may also be employed in an embedded system, including, but not limited to, a set-top box; a network device, such as a router, switch, or interface adapter; a camera or other video device; a storage controller, such as a RAID controller; a controller in an automobile; an audio device, such as an MP3 player; or various other portable devices. In particular, the microprocessor 100 is adapted for employment in computing systems 102 requiring reduced energy consumption. The I/O devices 144 may include devices as required by the particular application to which the system 102 is directed, including, but not limited to, analog-to-digital converters; digital-to-analog converters; CODECs; digital signal processors; media access controllers; and the like. The memory 142 may include, but is not limited to, volatile memory, such as random access memory (RAM), dynamic RAM (DRAM), synchronous DRAM (SDRAM), and the like; and non-volatile storage devices such as read-only memory (ROM), programmable ROM (PROM), and FLASH memory.

The voltage manager 132 supplies a variable operating voltage (Vddopt) 152 to the microprocessor 100, memory 142, I/O devices 144, and clock manager 134. The voltage manager 132 receives a constant voltage (Vddmax) 156, such as from a battery or commercial power source. The constant voltage 156 is the maximum voltage level that the voltage manager 132 may supply to the other system 102 elements. The voltage manager 132 includes a DC-DC converter 146 that performs the conversion from the constant voltage 156 to the variable operating voltage 152 in response to a voltage control signal 162 provided by the microprocessor 100. Although in the embodiment of FIG. 1 the voltage manager 132 supplies the variable operating voltage 152 to all the system 102 elements, other embodiments are contemplated in which the voltage manager 132 supplies the variable operating voltage 152 to only a portion of the system 102 elements, such as the microprocessor 100, and the remaining system 102 elements are supplied by the constant voltage 156 and/or a different voltage level. Furthermore, embodiments are contemplated in which the voltage-frequency scheduler 108 discussed herein controls multiple variable operating voltages to different system 102 elements depending upon their power requirements.

The clock manager 134 supplies a variable frequency clock signal (Fopt) 154 to the microprocessor 100, memory 142, and I/O devices 144. The clock manager 134 receives a constant frequency clock signal (Fmax) 158, such as from an oscillator circuit. The constant frequency clock signal 158 is the maximum clock frequency signal that the clock manager 134 may supply to the other system 102 elements. The clock manager 134 includes a clock divider 148 that performs the conversion from the constant clock frequency signal 158 to the variable frequency clock signal 154 in response to a clock control signal 164 provided by the microprocessor 100. The voltage manager 132 provides a control signal 166 to the clock manager 134. When the voltage-frequency scheduler 108 has instructed the voltage manager 132 to raise the variable operating voltage 152 via voltage control signal 162 so that the variable clock frequency 154 may be raised (such as is performed at block 422 of FIGS. 4 through 7), the voltage manager 132 informs the clock manager 134 that the variable operating voltage 152 has stabilized such that the clock manager 134 may now increase the variable frequency clock 154. In one embodiment, the voltage manager 132 employs an open loop voltage regulator. In another embodiment, the voltage manager 132 employs a closed loop voltage regulator, which includes a sensor that receives an early version of the variable frequency clock signal 154 that conveys the clock signal with a frequency to which the voltage-frequency scheduler 108 has instructed the clock manager 134 to adjust to via clock control signal 164. The sensor detects the early version of the variable frequency clock signal 154 and controls the voltage manager 132 to raise or lower the variable operating voltage 152, rather than the voltage-frequency scheduler 108 directly controlling the voltage manager 132 via the voltage control signal 162. Advantageously, the closed loop embodiment potentially more closely controls the voltage manager 132 to output a lower variable operating voltage 152 than an open loop embodiment. Although in the embodiment of FIG. 1 the clock manager 134 supplies the variable operating frequency 154 to all the system 102 elements, other embodiments are contemplated in which the clock manager 134 supplies the variable operating frequency 154 to only a portion of the system 102 elements, such as the microprocessor 100, and the remaining system 102 elements are supplied by the constant frequency 158 and/or a different frequency. Furthermore, embodiments are contemplated in which the voltage-frequency scheduler 108 discussed herein controls multiple variable operating frequencies to different system 102 elements depending upon their clocking requirements.

The microprocessor 100 includes a number of pipeline stages, including an instruction cache 112 configured to cache instructions of programs such as application programs and system software. The application programs may include any programs configured to execute on the system 102, such as programs configured to perform the desired functions as mentioned above. The system software may include a general purpose operating system, including, but not limited to, Microsoft Windows, Linux, Unix, etc., or real-time operating systems or embedded system executives. In particular, the system software is responsible for providing information used to perform dynamic voltage-frequency scaling that is global to the various application programs and threads, as discussed in more detail below. The microprocessor 100 fetches the program instructions from the system memory 142. The programs may be stored in non-volatile storage devices and loaded into the system memory 142 for execution there from.

An instruction fetch stage 114 fetches program instructions from the instruction cache 112 and provides the fetched instructions to an instruction decode stage 116. An instruction issue stage 118 issues decoded instructions to execution units 122 of the microprocessor 100. The microprocessor 100 also includes a data cache 126 for caching data fetched from the system memory 142.

A write-back stage 124 of the microprocessor 100 receives execution results from the execution units 122 and writes the results back into general purpose registers 204 (of FIG. 2) or other registers of the microprocessor 100. In one embodiment, the microprocessor 100 is a multithreaded microprocessor 100 capable of concurrently fetching, decoding, issuing, and executing instructions from a plurality of different threads of execution. The microprocessor 100 includes a plurality of thread contexts 104, described in more detail with respect to FIG. 2, for storing state associated with a corresponding plurality of threads. In particular, the thread contexts 104 provide program counter addresses to the instruction fetch stage 114 for use in fetching the instructions of the various threads. The thread contexts 104 include quality-of-service (QoS) information 106 specified by the application programs executed by the microprocessor 100, which is discussed in more detail below with respect to FIG. 3.

The microprocessor 100 also includes a thread scheduler 128 that communicates with the instruction issue stage 118 to schedule the issuing, or dispatching, of instructions among the thread contexts 104 to the execution units 122. In particular, the thread scheduler 128 schedules the thread contexts 104 for instruction issue based on the QoS information 106 specified by the applications. The thread scheduler 128 also receives from the execution units 122 an instruction completed indicator 138 that indicates each clock cycle which of the thread contexts 104 has an instruction that has completed execution. During some clock cycles the instruction completed indicator 138 may indicate zero instructions have been completed. In one embodiment, during some clock cycles the instruction completed indicator 138 may indicate instructions have been completed for multiple thread contexts 104 and/or multiple instructions for one or more thread contexts 104. The thread scheduler 128 schedules the thread contexts 104 for instruction issue based on the instruction completion information 138 in conjunction with the QoS information 106. In one embodiment, the thread scheduler 128 also communicates with the instruction fetch stage 112 to schedule the fetching of instructions among the thread contexts 104 based on the QoS information 106 and instruction completion information 138.

The microprocessor 100 also includes a voltage-frequency scheduler 108 that generates the voltage control signal 162 and clock control signal 164 to control the scaling of the variable operating voltage 152 and variable frequency clock signal 154, respectively, in order to reduce energy consumption by the system 102, as described herein. The voltage-frequency scheduler 108 also receives the instruction completed information 138 from the execution units 122 and the QoS information 106 from the thread contexts 104 for use in controlling the operating voltage 152 and frequency 154. The voltage-frequency scheduler 108 includes storage elements for storing the global VFS information 136. The voltage-frequency scheduler 108 is described in more detail below with respect to the remaining Figures.

In one embodiment, the thread scheduler 128 is bifurcated into dispatch scheduler and policy manager portions that communicate via a well-defined interface, as described in detail in U.S. patent application Ser. No. 11/051,997 which is hereby incorporated by reference in its entirety for all purposes. The dispatch scheduler is included within a reusable core of the microprocessor, whereas the policy manager is outside the core and customizable by a customer. The dispatch scheduler is scheduling policy-agnostic and issues instructions of the threads each clock cycle to the execution units 122 based on the scheduling policy communicated by the policy manager via priority signals for each thread in the interface. The policy manager updates the thread priorities in response to instruction completion information from the execution units 122. In this embodiment, the voltage-frequency scheduler 108 is incorporated into the policy manager portion of the thread scheduler 128.

Figure 2:
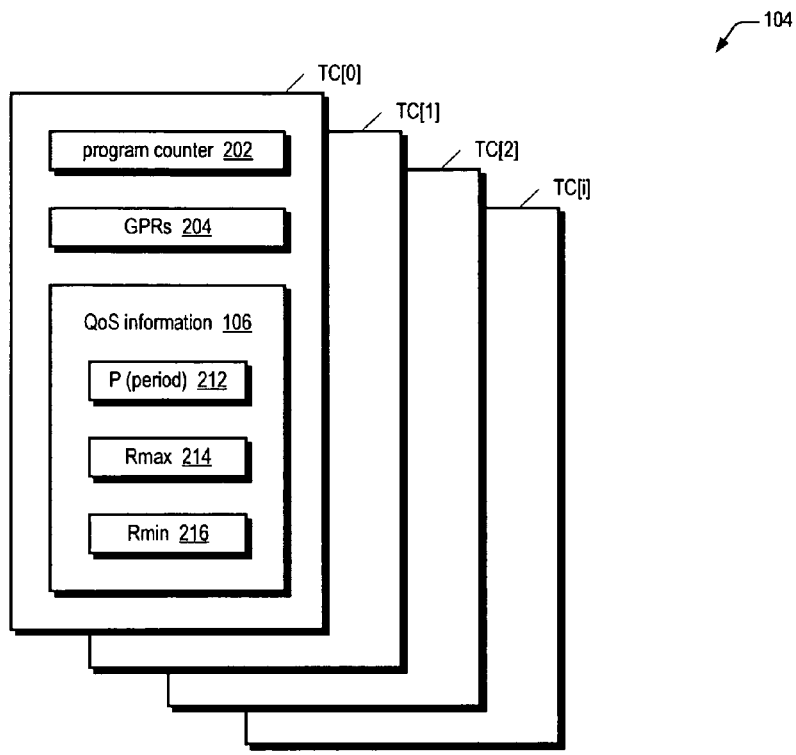
FIG. 2 is a block diagram illustrating the thread contexts of FIG. 1 in more detail.

Referring now to FIG. 2, a block diagram illustrating the thread contexts 104 of FIG. 1 in more detail is shown. A thread context 104 comprises a collection of registers and/or bits in registers of the microprocessor 102 that describe the state of execution of a thread. In one embodiment, a thread context 104 comprises a set of general purpose registers 204, a program counter (PC) 202, and registers for storing the QoS information 106 of FIG. 1. The QoS information 106 is programmed into the registers by the system software when an application program thread is commenced using QoS information specified by the application program. In one embodiment, the QoS information 106 registers reset to values indicating a default QoS initially used by the system software threads until modified thereby. In the embodiment of FIG. 2, the QoS information 106 registers include a register for storing a period (P) 212, a register for storing a maximum instruction rate (Rmax) 214, and a register for storing a minimum instruction rate (Rmin) 216. The period 212 is specified in a number of clock cycles. In one embodiment, the number of clock cycles specified is relative to the maximum clock frequency 158. The period 212 specifies the number of maximum clock frequency 158 cycles over which the thread is requesting the QoS specified by Rmax 214 and/or Rmin 216 be accomplished. Rmax 214 specifies the maximum number of instructions of the thread that the microprocessor 100 may be required to complete in the specified period 212 to accomplish the QoS required by the thread. Rmin 216 specifies the minimum number of instructions of the thread that the microprocessor 100 may be required to complete in the specified period 212 to accomplish the QoS required by the thread. Typically, the application developer determines the QoS information 106 values by profiling the application. For example, the developer may execute the application many times and determine the maximum and minimum instruction completion rates for each constituent thread of the application. It is noted that that state stored in a thread context 104 is not limited to the state shown in FIG. 2, but may include other thread-specific state.

Figure 3:
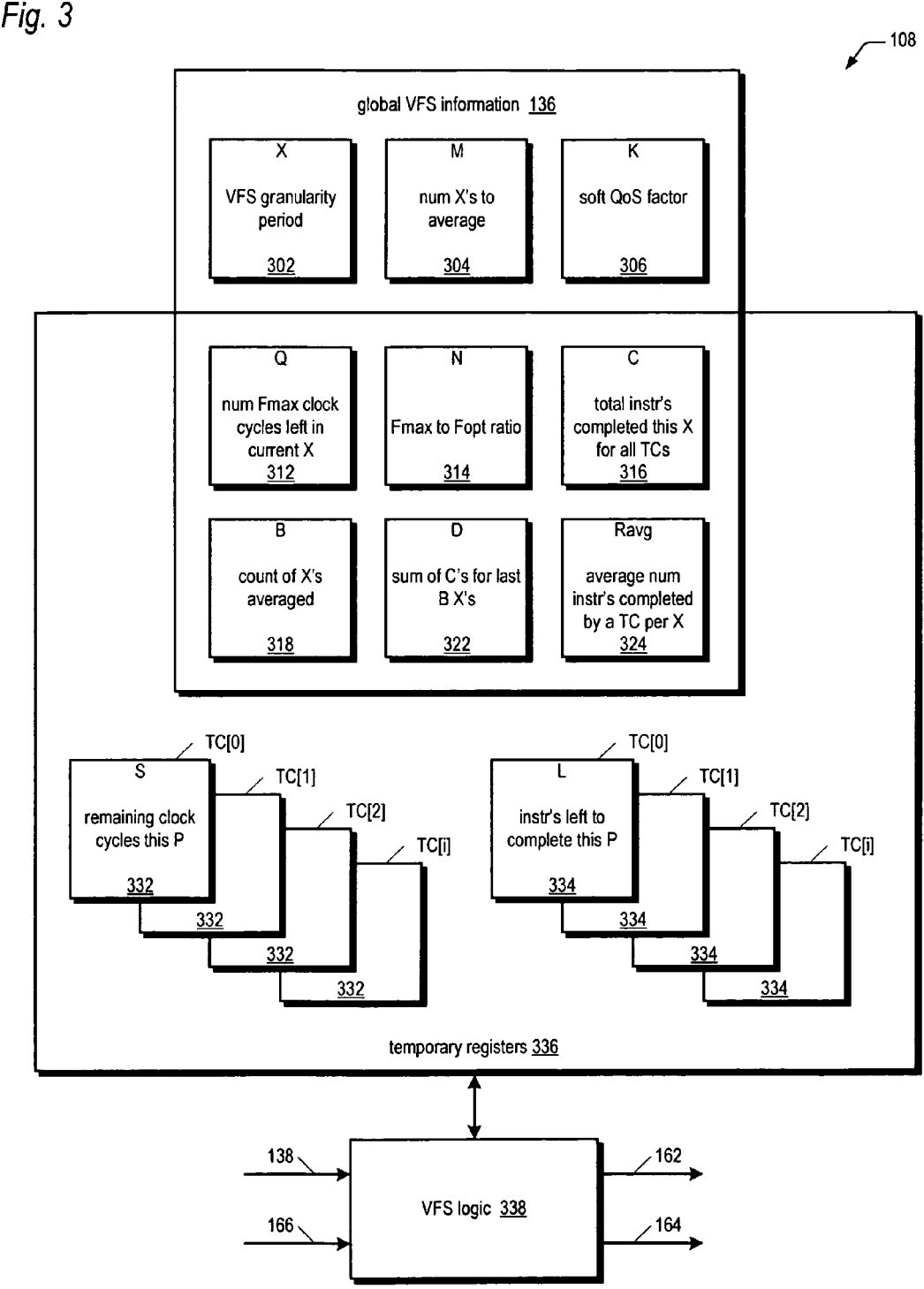
FIG. 3 is a block diagram illustrating in more detail the voltage-frequency scheduler of FIG. 1.

Referring now to FIG. 3, a block diagram illustrating in more detail the voltage-frequency scheduler 108 of FIG. 1 is shown. The voltage-frequency scheduler 108 includes registers for storing the global VFS information 136 of FIG. 1. The global VFS information 136 registers include a register 302 that stores the VFS granularity period, referred to herein as X. The system software specifies the value of X as a number of clock cycles at maximum clock frequency 158. At the expiration of each period equivalent to X maximum clock frequency 158 clock cycles, the voltage-frequency scheduler 108 computes the aggregate utilization of the thread contexts 104, and if necessary, adjusts the operating voltage 152 and frequency 154 in response thereto, as described in more detail below.

The global VFS information 136 registers also include a register 304 that stores a value denoted M, which is the number of VFS granularity periods 302 over which to compute an average number of instructions completed by a thread context 104 per VFS granularity period 302, which is stored in a temporary register 324 and denoted Ravg. The system software specifies the value of M as a counting number. The value of M and Ravg are used in the embodiment of FIG. 6 as discussed below. The global VFS information 136 registers also include a register 306 that stores a soft QoS factor, denoted K, and used in the embodiment described with respect to FIG. 7.

The voltage-frequency scheduler 108 also includes a plurality of registers 336 for storing temporary values used to compute the utilization of the microprocessor 100 by the threads. Some of the temporary registers 336 store global temporary values and some store temporary values that are specific to each thread context 104.

The temporary registers 336 include a register 312 that stores a number of maximum clock frequency 158 clock cycles left in the current VFS granularity period 302, which is denoted Q. The Q register 312 is loaded with the X register 302 value at the beginning of each VFS granularity period 302 and decremented each clock cycle by the value of N described below.

The temporary registers 336 also include a register 314 that stores the ratio of the maximum clock frequency 158 to the variable frequency clock 154, which is denoted N. For example, if the current variable clock frequency 154 is one-third the maximum clock frequency 158, then the value of N is three. The N value provides a means of decrementing each operating clock cycle the various clock counts described below by an equivalent number of maximum clock frequency 158 clock cycles, which is necessary since the applications specify the values in terms of a number of maximum clock frequency 158 clock cycles.

The temporary registers 336 also include a register 316 that stores a total of the number of instructions completed this VFS granularity period 302 for all thread contexts 104, which is denoted C. The value of C is incremented each time the instruction completion indicator 138 indicates an instruction was completed, regardless of which thread context 104 the instruction was completed for. The temporary registers 336 also include a register 318 that stores a count of the number of VFS granularity periods averaged to produce Ravg, which is denoted B. The value of B is incremented each time an X completes, and is reset to zero whenever the Mth X completes. The temporary registers 336 also include a register 322 that stores a sum of the C values for the last B VFS granularity periods, which is denoted D. The value of C is added to the value of D each time an X completes, and D is reset to zero whenever the Mth X completes. The values of M, C, B, and D are all used to compute Ravg as described below.

The temporary registers 336 also include a register 332 for each thread context 104 that stores the remaining number of maximum clock frequency 158 clock cycles in the period 212 currently specified for the thread context 104, which is denoted S. The S register 332 is initialized with the value of P at the beginning of each period 212 and decremented each clock cycle by the value of N. The temporary registers 336 also include a register 334 for each thread context 104 that stores the remaining number of instructions to complete in the period 212 currently specified for the thread context 104, which is denoted L. The L register 334 is initialized with a value at the beginning of each period 212 which is different depending upon the particular scheme employed by the voltage-frequency scheduler 108, such as the embodiments of FIGS. 4 through 7. The value stored in register 334 is decremented each time the instruction completion indicator 138 indicates an instruction was completed for the thread context 104.

The voltage-frequency scheduler 108 includes logic 338 that receives the instruction completion information 138, thread context 104 information, and global VFS information 136 of FIG. 1, and the information stored in the temporary registers 336. In response, the logic 338 generates the voltage control signal 162 and clock control signal 164 of FIG. 1 according to various embodiments, such as those described in the flowcharts of FIGS. 4 through 7. The logic 338 comprises arithmetic and logic circuits to perform the following functions, including, but not limited to: comparison, addition, subtraction, increment, decrement, multiply, divide, and shift. Embodiments are contemplated in which some of the functions may be performed by table lookups to reduce the time and/or circuit area required to produce a result, such as a quotient or product. Table lookups may be particularly relevant where the number of possibilities is relatively small. For example, the number of possible voltage and frequency steps may be on the order of tens, which may lend itself to relatively small tables. Furthermore, input values to the tables may be truncated to reduce table sizes. One embodiment is contemplated in which the application specifies the Rmax 214 and Rmin 216 values with respect to a common period for all threads (rather than allowing each thread to have a different period value), which may eliminate the need for a divide, such as in the step of block 418 of FIG. 4.

Figure 4:
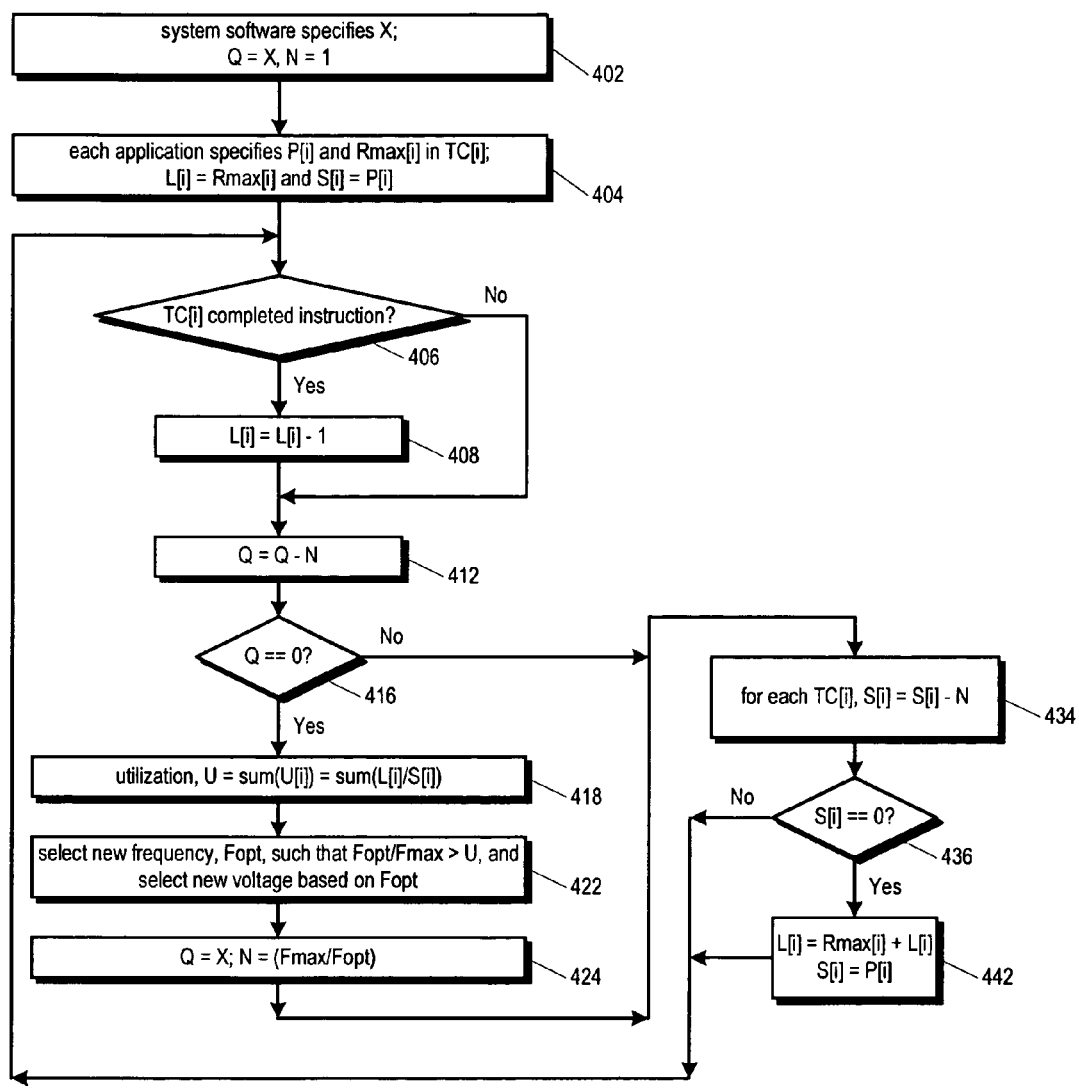
FIGS. 4 through 7 are flowcharts illustrating operation of the system of FIG. 1 according to four embodiments of the present invention.

Referring now to FIG. 4, a flowchart illustrating operation of the system 102 of FIG. 1 according to a first embodiment of the present invention is shown. Flow begins at block 402.

At block 402, system software programs the X value into the X register 302 of FIG. 3. Additionally, the voltage-frequency scheduler 108 initializes the Q register 312 with the value of X and initializes the N register 314 with the value of 1, since initially the system 102 is operating at the maximum clock frequency 158. Flow proceeds to block 404.

At block 404, when a thread starts up it provides its QoS parameters, which the system software programs into the appropriate QoS information registers 106 of the thread context 104 allocated for the new thread. In the embodiment of FIG. 4, the application associated with the new thread specifies the P and Rmax values, which the system software programs into the respective registers 212 and 214. Additionally, the system software programs the L register 334 of the thread context 104 with the specified Rmax value and programs the S register 332 of the thread context 104 with the specified period value. Flow proceeds to decision block 406.

In one embodiment, the steps of blocks 406 through 442 are performed each cycle of the variable frequency clock 154. However, some steps may require additional clock cycles, such as highly computation-intensive steps.

At decision block 406, during the next variable frequency clock cycle 154, the VFS logic 338 of FIG. 3 examines the instruction completion input 138 to determine whether the microprocessor 100 has completed an instruction for any of the thread contexts 104. If so, flow proceeds to block 408; otherwise, flow proceeds to block 412.

At block 408, the logic 338 decrements the L value in register 334 of each thread context 104 that completed an instruction as determined at decision block 406. Flow proceeds to block 412.

At block 412, the logic 338 decrements the Q value in register 312 by the N value in register 314. Flow proceeds to decision block 416.

At decision block 416, the logic 338 examines the Q value in register 312 to determine whether Q equals zero. If so, flow proceeds to block 418; otherwise, flow proceeds to block 434.

At block 418, the logic 338 computes the aggregate utilization, denoted U, of the microprocessor 100 by the thread contexts 104. In the embodiment of FIG. 4, the aggregate utilization is computed as the sum of the individual utilizations of each of the active thread contexts 104. Each individual thread context 104 utilization is computed as the quotient of its L value and S value. Thus, the utilization for a thread context 104 is essentially a measure of the amount of work remaining to be done in the amount of time remaining in the current period for the thread context 104. Because each thread context 104 may specify a different period, and because each thread context's 104 period may begin at a different time due to the fact that thread contexts 104 may be dynamically allocated according to one embodiment, the period for each thread context 104 may end at a different clock cycle. Hence, the aggregate utilization effectively normalizes the individual utilization of each thread context 104 to a common period, and is essentially a measure of the amount of work remaining to be done by the active thread contexts 104 taken as a whole in the amount of time remaining in the effective common period. Although an embodiment for calculating the aggregate utilization is shown in FIG. 4, other embodiments are contemplated, and may be employed within the present invention to accomplish dynamic voltage-frequency scaling in a microprocessor that concurrently executes multiple threads. For example, in an alternate embodiment, U is calculated by U=(sum(L[i])*numTCs)/sum(S[i]). Additionally, FIG. 7 describes an alternate embodiment for calculating the aggregate utilization. Flow proceeds to block 422.

At block 422, the logic 338 selects a new operating voltage 152 and frequency 154 and generates the appropriate values on the voltage control signal 162 and clock control signal 164 to control the voltage manager 132 and clock manager 134, respectively, to effect the desired operating voltage 152 and frequency 154. The logic 338 selects the new operating frequency 154 such that the ratio of the new operating frequency 154 to the maximum clock frequency 158 is greater than the aggregate utilization calculated at block 418. The logic 338 then selects the new operating voltage 152 based on the new operating frequency 154. That is, the logic 338 selects an operating voltage 152 that will supply sufficient power to the microprocessor 100 or system 102 to meet the timing requirements thereof. Thus, if the aggregate utilization is greater than one, then the operating voltage 152 and frequency 154 is increased; whereas, if the aggregate utilization is less than one, then the operating voltage 152 and frequency 154 is decreased. The selection of the new operating voltage 152 and frequency 154 may be performed in various ways, including, but not limited to, table lookups or a closed loop fashion, such as employing a ring oscillator circuit in the voltage manager 132. Flow proceeds to block 424.

At block 424, the logic 338 loads the Q register 312 with the value of X stored in the X register 302 and loads the N register 314 with the ratio of maximum clock frequency 158 and the new operating frequency 154. Thus, N is updated with a number of maximum clock frequency 158 clock cycles constituting an amount of time equal to a single clock cycle at the new operating frequency 154. Flow proceeds to block 434.

At block 434, for each thread context 104, the logic 338 decrements the respective S register 332 by the value of N. Flow proceeds to decision block 436.

At block 436, for each thread context 104, the logic 338 examines the value stored in the S register 332 to determine whether the value equals zero. If so, flow proceeds to block 442; otherwise, flow returns to decision block 406 to begin the next clock cycle.

At block 442, since the thread context's 104 period 212 has expired, the logic 338 updates the L register 334 with the sum of Rmax 214 and the current value of the L register 334. Additionally, the logic 338 updates the S register 332 with the P register 212 value. Flow returns to decision block 406 to begin the next clock cycle.

In order to provide quality of service requirements for real-time threads, the applications must provide the QoS information 106 to the thread scheduler 128 to enable it to schedule the issuance of instructions from the various thread contexts 104 to meet the QoS requirements based on the instruction completion information 138. As may be observed from FIG. 4, the voltage-frequency scheduler 108 advantageously takes advantage of a synergistic relationship with the thread scheduler 128 by utilizing the application-specified QoS information 106 and instruction completion information 138 to perform dynamic voltage-frequency scaling in order to reduce energy consumption of the microprocessor 100 and/or system 102. Advantageously, the voltage-frequency scheduler 108 is capable of detecting a change in aggregate utilization by the thread contexts 104 within tens of clock cycles and responsively controlling the voltage manager 132 to adjust the operating voltage 152 of the system 102 accordingly in a very fine-grained manner.

It is noted that applications will typically specify the P values larger than the X values. The P values may typically be on the order of milliseconds. For example, the application might specify a period for a speech CODEC on the order of 5 milliseconds. Similarly, the application might specify a period for an MPEG decoder frame on the order of 10 milliseconds. In contrast, the system software selects the X value to optimize energy consumption reduction. The X value is dependent upon a number of factors, including, but not limited to, the DC-DC converter 146 voltage switching time capabilities and the mix and types of threads executing on the microprocessor 100. In embodiments in which fast DC-DC converters 146 are employed, the system software may specify X on the order of hundreds, or even tens, of nanoseconds.

In one embodiment, the application may also specify at block 402 one or more events, such as interrupts. In this embodiment, the voltage-frequency scheduler 104 does not begin counting down the period specified by the application (such as is performed at step 434) or counting down instructions completed (such as is performed at step 408) until one or more of the specified events occurs. In the event-driven embodiment, the application may optionally specify that the QoS input parameters are only to be used once, or alternatively, that the QoS input parameters are to be used again at the recurrence of one or more of the specified events. Examples of event-driven threads include threads that process packets in a network processor, such as classification/forwarding of IP packets and decoding 802.11 packets from an arbitrated CSMA/CA media.

Figure 5:
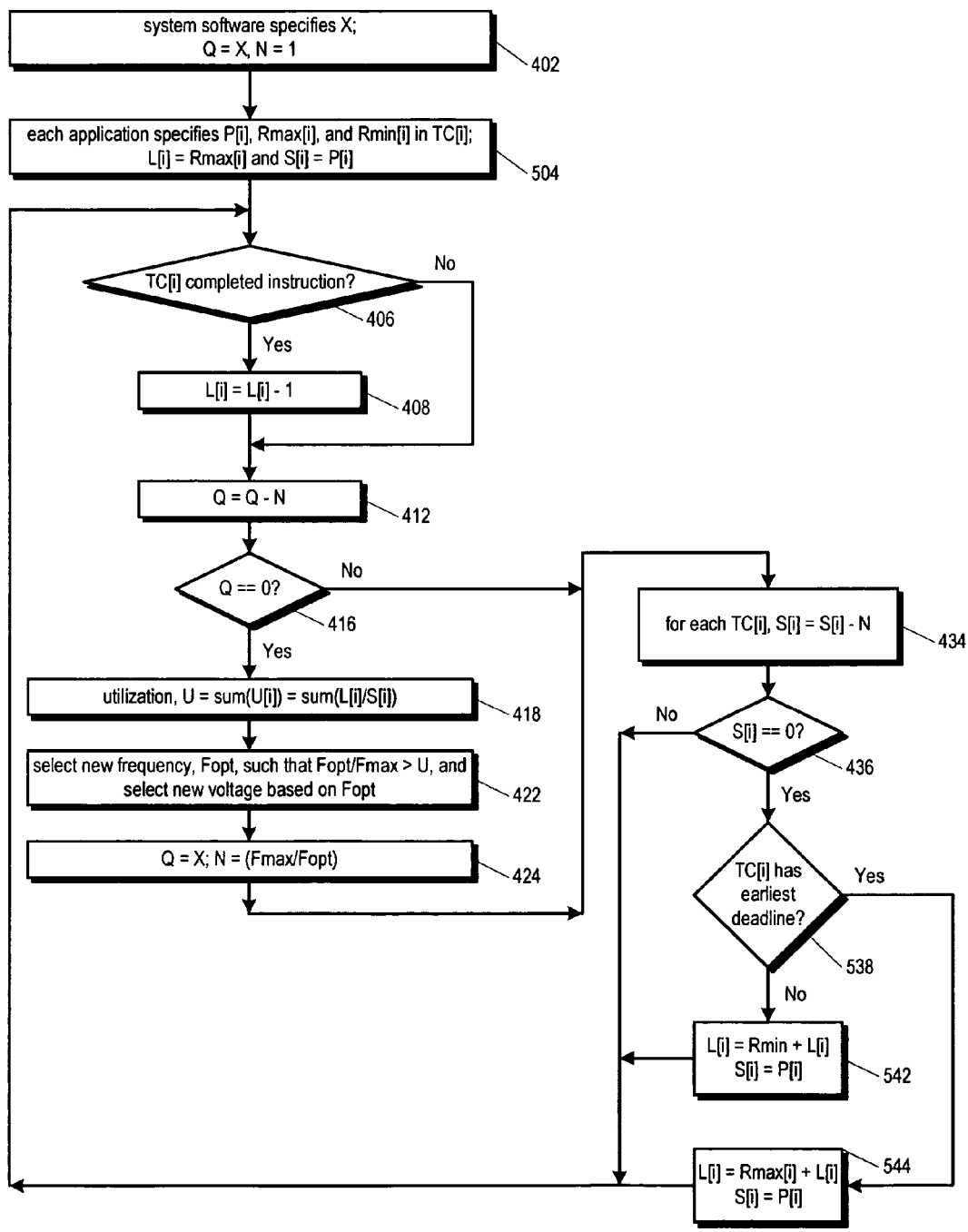

Referring now to FIG. 5, a flowchart illustrating operation of the system 102 of FIG. 1 according to a second embodiment of the present invention is shown. Many steps of FIG. 5 are similar to steps of FIG. 4. Like steps are numbered identically, and their description is not repeated for the sake of brevity. Differences between FIGS. 4 and 5 are now described.

In FIG. 5, block 504 replaces block 404 of FIG. 4. At block 504, in addition to the steps described above with respect to block 404, the thread also specifies an Rmin value in its QoS parameters, which the system software programs into the Rmin register 216 of FIG. 2 of the thread context 104 allocated for the new thread. In one embodiment, the applications optionally specify an Rmin 216 value. That is, a portion of the applications may specify an Rmin 216 value and a portion of the applications may not specify an Rmin 216 value, in which case the voltage-frequency scheduler 108 uses the Rmax 214 value at block 542 if the Rmin 216 value is unspecified.

In FIG. 5, a decision block 538 replaces block 442 of FIG. 4. At decision block 538, the logic 338 determines whether the thread context 104 whose period 212 has just expired has the earliest deadline. The thread context 104 with the earliest deadline is the thread context 104 whose P will expire next, as indicated by the current value of its S register 332 value. Since the thread context 104 whose P has just expired has a zero value in its S register 332, the logic 338 compares the value in the P register 212 of the just-expired thread context 104 with the S register 332 value of the other thread contexts 104. If the thread context 104 whose period 212 has just expired has the earliest deadline, flow proceeds to block 544; otherwise, flow proceeds to block 542.

At block 542, the logic 338 updates the L register 334 with the sum of Rmin 216 and the current value of the L register 334. Additionally, the logic 338 updates the S register 332 with the P register 212 value. By updating the L register 334 using Rmin 216 rather than Rmax 214, the embodiment of FIG. 5 advantageously attempts to recover some of the dynamic slack between the Rmin 216 and Rmax 214 QoS parameters of the thread context 104. In an alternate embodiment, at block 542, logic 338 updates the L register 334 as follows: L[i]=Rmax[i]/J+L[i], where J is an application-specified constant. This embodiment advantageously does not require the application to specify Rmin. Flow returns to decision block 406 to begin the next clock cycle.

At block 544, the logic 338 updates the L register 334 with the sum of Rmax 214 and the current value of the L register 334. Additionally, the logic 338 updates the S register 332 with the P register 212 value. Flow returns to decision block 406 to begin the next clock cycle.

An example of an application for which the embodiment of FIG. 5 may advantageously recover some of the dynamic slack is an MPEG decoder that may execute a widely varying number of instructions during different periods depending upon the input data. For example, to decode a fast-changing scene, the decoder may require the microprocessor 100 to execute a number of instructions approaching the Rmax value, whereas to decode a relatively stationary scene, the number may approach the Rmin value.

Figure 6:
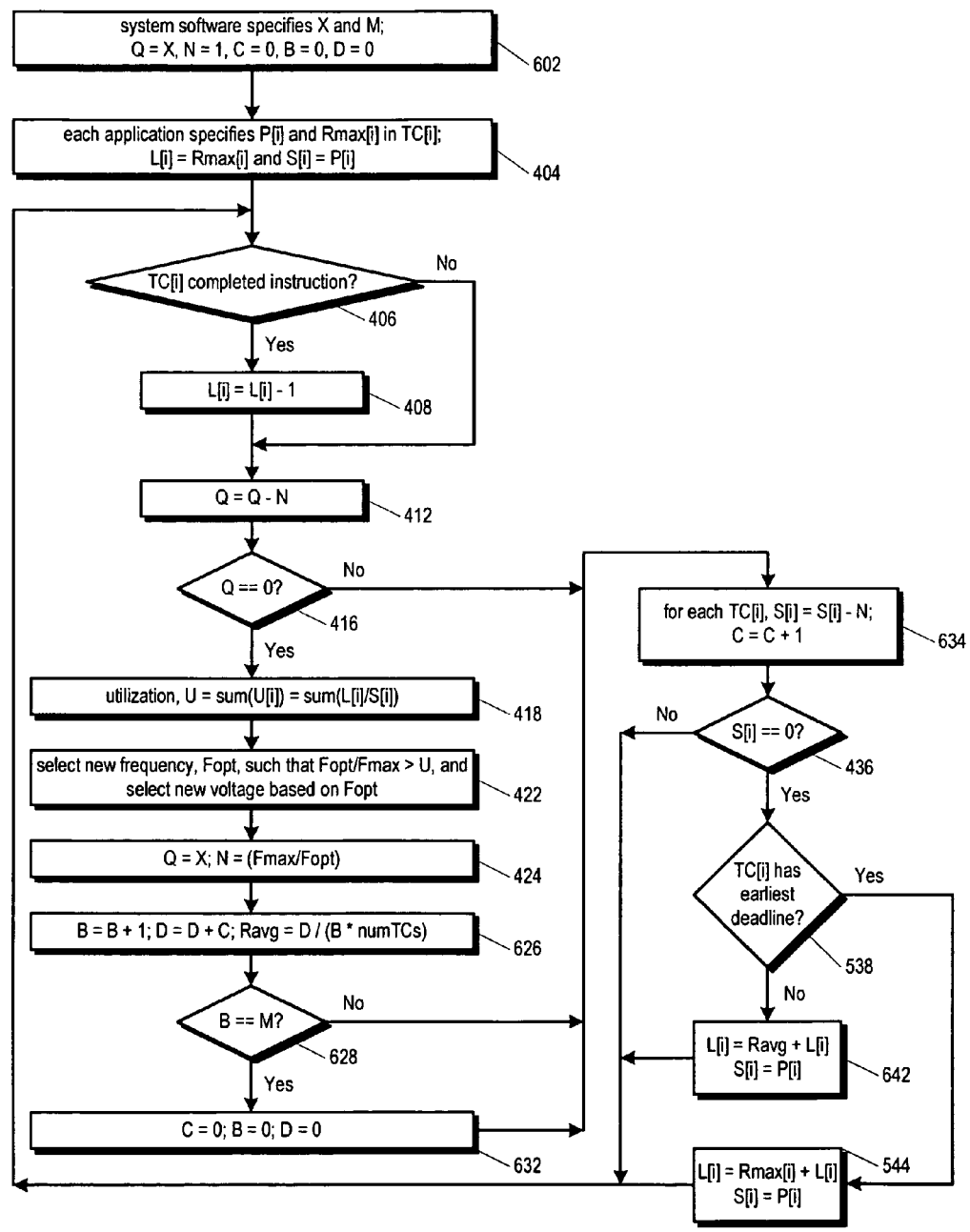

Referring now to FIG. 6, a flowchart illustrating operation of the system 102 of FIG. 1 according to a third embodiment of the present invention is shown. Many steps of FIG. 6 are similar to steps of FIGS. 4 and 5. Like steps are numbered identically, and their description is not repeated for the sake of brevity. Differences between FIG. 6 and FIGS. 4 and 5 are now described.

In FIG. 6, block 602 replaces block 402 of FIG. 5. At block 602, in addition to the steps described above with respect to block 402, system software programs the M value into the M register 304 of FIG. 3. Additionally, the voltage-frequency scheduler 108 initializes the C register 316, B register 318, and D register 322 with the value of zero.

In FIG. 6, flow proceeds from block 424 to block 626. At block 626, logic 338 increments the B register 318 value by one, increments the D register 322 value by C, and calculates the Ravg value and writes it into the Ravg register 324. The logic 338 calculates the Ravg value by dividing D by the product of B and the number of active thread contexts 104. Flow proceeds to decision block 628.

At decision block 628, logic 338 determines whether B is equal to M. If so, flow proceeds to block 632; otherwise, flow proceeds to block 634, which replaces block 434 of FIG. 5.

At block 632, logic 338 loads the C register 316, B register 318, and D register 322 with a value of zero. Flow proceeds to block 634.

At block 634, in addition to the steps described with respect to block 434, logic 338 increments C by one.

In FIG. 6, block 642 replaces block 542 of FIG. 5. At block 642, the value of Ravg computed at block 626 is used in place of Rmin. That is, the logic 338 updates the L register 334 with the sum of Ravg 324 and the current value of the L register 334.

Figure 7:
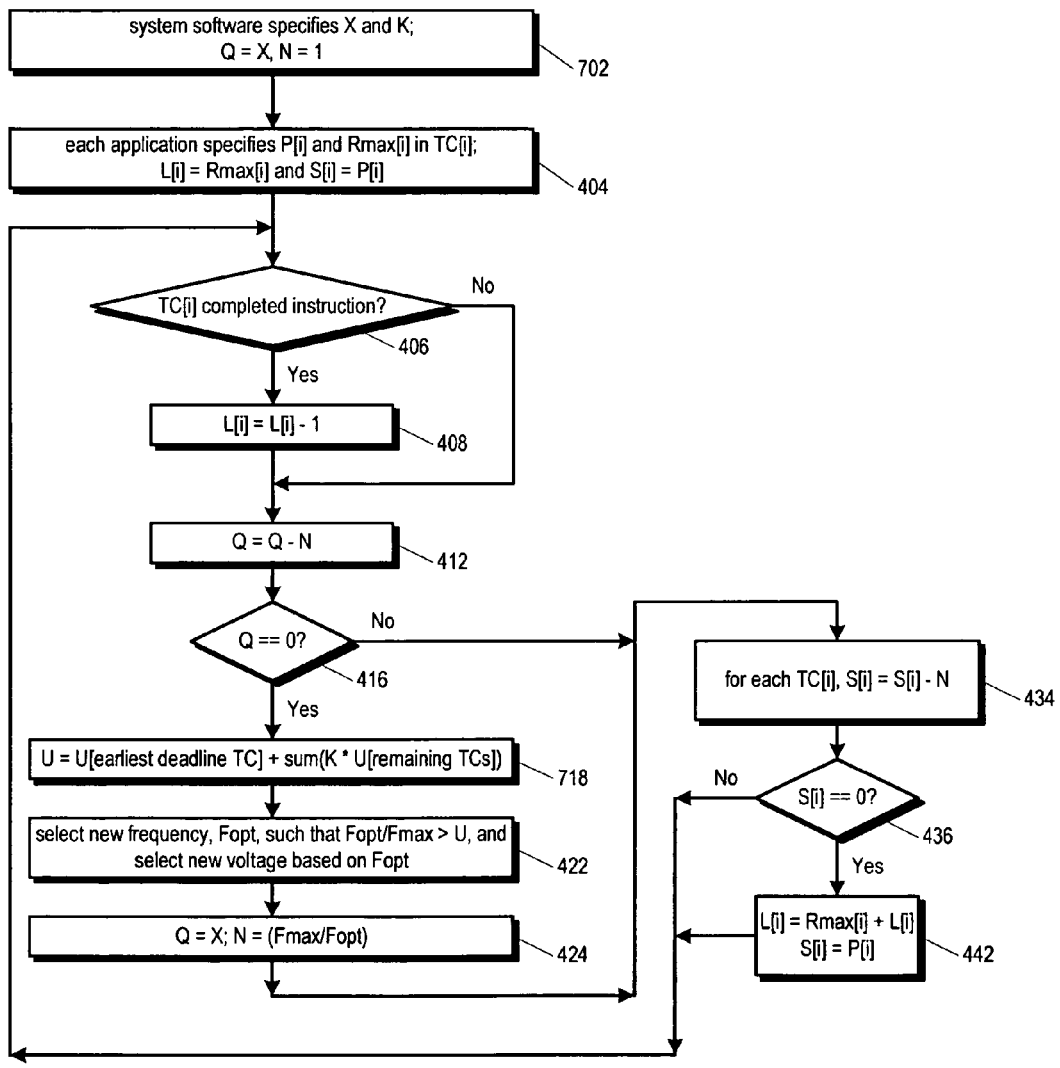

Referring now to FIG. 7, a flowchart illustrating operation of the system 102 of FIG. 1 according to a fourth embodiment of the present invention is shown. Many steps of FIG. 7 are similar to steps of FIG. 4. Like steps are numbered identically, and their description is not repeated for the sake of brevity. Differences between FIGS. 4 and 7 are now described.

In FIG. 7, block 702 replaces block 402 of FIG. 4. At block 702, in addition to the steps described above with respect to block 402, the system software specifies a value for K, which is loaded into the K register 306.

In FIG. 7, block 718 replaces block 418 of FIG. 4. Logic 338 calculates the aggregate utilization, U, as the sum of the utilization of the thread context 104 with the current earliest deadline and the sum of, for each thread context 104, the product of K and the utilization of the thread context 104. As may be observed, the embodiment of FIG. 7 has the possibility of not providing the requested QoS in all cases, depending upon the value of K specified by the system software. The smaller the value of K, the higher the likelihood the requested QoS will not be accomplished.

In one embodiment, the system software provides reservation-based scheduling with admission control such that the system software allocates and activates a thread context 104 for a new thread only if the microprocessor 100 can guarantee to the thread the application-specified QoS requirements based on the already active thread contexts 104. It is noted that the embodiment of FIG. 4 guarantees that the QoS requirements will be met for any thread passing the admission control; in contrast, the embodiments of FIGS. 5 through 7 may not necessarily guarantee the QoS requirements, particularly if the application specifies aggressive values, such as for Rmin, M, and K. These embodiments are suitable for threads that do not have hard real-time QoS requirements, but that instead may tolerate variances in the specified QoS. In other embodiments, the QoS requirements are statically determined such that admission control is not required, for example, in a system in which all threads are statically created.

Embodiments of the microprocessor 100 have been described herein that include a dynamic voltage-frequency scheduler 108 to track the utilization of the microprocessor 100 by multiple threads executing thereon with respect to the quality-of-service requirements of the threads, and to scale the operating voltage-frequency of the microprocessor 100 based on the utilization. The dynamic voltage-frequency scheduler 104 circuitry operates concurrently with other circuitry of microprocessor 100, such as instruction fetch, decode, thread scheduler, and execution units, which process program instructions, such as application or system software instructions. Consequently, advantageously, the dynamic voltage-frequency scheduling function consumes effectively none of the instruction processing bandwidth of the microprocessor 100, leaving the instruction processing bandwidth for execution of the application or system software instructions. Because the dynamic voltage-frequency scaling circuitry is not consuming instruction processing bandwidth, it advantageously detects underutilization of the microprocessor 100 during more fine-grained periods than schemes that rely on software program instructions to track the utilization. The finer-grained underutilization determination advantageously potentially enables the dynamic voltage-frequency scaling circuitry to scale the voltage-frequency so as to potentially reduce consumption of the microprocessor 100 and/or system 102 more than previous schemes.

Although the present invention and its objects, features, and advantages have been described in detail, other embodiments are encompassed by the invention. For example, although embodiments have been described in which the voltage-frequency scheduler 108 scales the voltage-frequency based on the utilization by the thread contexts 104 relative to their QoS requirements, other embodiments are contemplated in which the voltage-frequency scheduler 108 also scales the voltage-frequency further based on other considerations, including but not limited to, leakage current, battery characteristics, DC-DC converter characteristics, and memory awareness. Furthermore, although four different embodiments for dynamically scaling the voltage-frequency in the microprocessor 100 are described, the embodiments are described by way of example, and the invention is not limited thereto. Rather, the microprocessor 100 may be modified according to other embodiments that employ the QoS information and instruction completion information to calculate aggregate utilization by the thread contexts 104 and responsively perform dynamic voltage-frequency scaling by the voltage-frequency scheduler 108 to reduce the energy consumption of the microprocessor 100, without requiring software executing on the microprocessor 100 to perform the voltage-frequency scaling function. Finally, although embodiments have been described in which the threads have real-time quality-of-service requirements, embodiments are contemplated in which the mix of threads may include threads with non-real-time QoS requirements.

Figure 8:
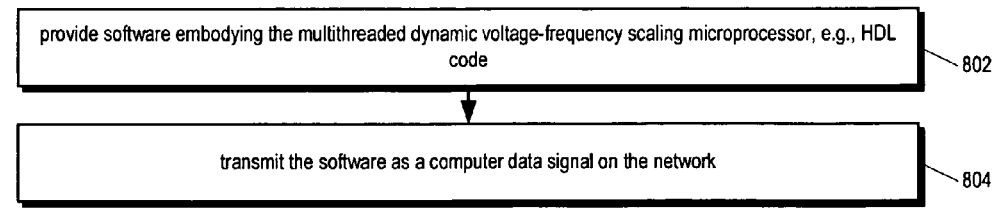
FIG. 8 is a flowchart illustrating a method for providing software for performing the steps of the present invention and subsequently transmitting the software as a computer data signal over a communication network.

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing operating system software described herein by providing the software and subsequently transmitting the software as a computer data signal over a communication network including the Internet and intranets, such as shown in FIG. 8. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

We claim:

1. A multithreaded microprocessor, comprising:
   a plurality of thread contexts, each configured to store application-specified quality-of-service (QoS) information for a corresponding plurality of threads concurrently executed by the microprocessor;
   an indicator, for indicating instruction completion information specifying for which of said plurality of thread contexts the microprocessor completed an instruction;
   a thread scheduler, coupled to said plurality of thread contexts and said indicator, configured to schedule instructions of said plurality of thread contexts to issue to execution units of the microprocessor based on said QoS information and said instruction completion information; and
   a voltage-frequency scheduler, coupled to said plurality of thread contexts and said indicator, configured to determine an aggregate utilization of the microprocessor by said plurality of threads based on said QoS information and said instruction completion information during a first period while the microprocessor is operating at a first frequency and voltage, and to cause the microprocessor to operate at a second frequency and voltage during a second period based on said aggregate utilization, wherein said second frequency and voltage are different from said first frequency and voltage,
   wherein said QoS information comprises a number of instructions to complete over a number of clock cycles to accomplish a required quality-of-service for said corresponding thread.

2. The microprocessor as recited in claim 1, further comprising:
   logic, coupled to said plurality of thread contexts and said indicator, configured to calculate said aggregate utilization as an aggregation of a remaining number of said number of instructions to complete relative to a remaining number of said number of clock cycles for each of said plurality of thread contexts at an end of said first period.

3. The microprocessor as recited in claim 2, wherein said logic is further configured to select said second frequency such that said second frequency relative to a maximum frequency of the microprocessor is at least as great as said aggregate utilization.

4. The microprocessor as recited in claim 3, wherein said number of instructions to complete comprises a maximum number of instructions to complete over said number of clock cycles to accomplish said required quality-of-service for said corresponding thread.

5. The microprocessor as recited in claim 4, wherein said QoS information further comprises a minimum number of instructions to complete over said number of clock cycles which has a possibility of accomplishing said required quality-of-service for said corresponding thread.

6. The microprocessor as recited in claim 5, wherein said logic is configured to calculate said aggregate utilization based on a first utilization determined beginning with said maximum number of instructions for a first portion of said plurality of thread contexts, and based on a second utilization determined beginning with said minimum number of instructions for a second portion of said plurality of thread contexts.

7. The microprocessor as recited in claim 6, wherein said logic is further configured to determine said first portion of said plurality of thread contexts as having an earliest deadline of said plurality of thread contexts.

8. The microprocessor as recited in claim 2, wherein said logic is configured to calculate said aggregate utilization based on an aggregation of an unweighted utilization of a first portion of said plurality of thread contexts and a weighted utilization of a second portion of said plurality of thread contexts.

9. The microprocessor as recited in claim 8, wherein said logic is further configured to determine said first portion of said plurality of thread contexts as having an earliest deadline of said plurality of thread contexts.

10. The microprocessor as recited in claim 8, wherein said weight is specified by system software executing on the microprocessor.

11. The microprocessor as recited in claim 2, wherein said logic is configured to calculate said aggregate utilization based on a first utilization determined beginning with said number of instructions for a first portion of said plurality of thread contexts, and based on a second utilization determined beginning with an average number of instructions for a second portion of said plurality of thread contexts.

12. The microprocessor as recited in claim 11, wherein logic is further configured to calculate said average number of instructions for said second portion of said plurality of thread contexts as an average number of instructions completed by all of said plurality of thread contexts over a third period.

13. The microprocessor as recited in claim 12, wherein said third period is specified by system software executing on the microprocessor.

14. The microprocessor as recited in claim 12, wherein said logic is further configured to determine said second portion of said plurality of thread contexts as having an earliest deadline of said plurality of thread contexts.

15. The microprocessor as recited in claim 2, further comprising:
a register, for each of said plurality of thread contexts, for storing said remaining number of said number of instructions to complete.

16. The microprocessor as recited in claim 15, further comprising:
a second register, for each of said plurality of thread contexts, for storing said remaining number of said number of clock cycles.

17. The microprocessor as recited in claim 1, further comprising:
a register, coupled to said voltage-frequency scheduler, configured to store a value specifying said first period.

18. The microprocessor as recited in claim 17, wherein said register is initializable by software executing on the microprocessor.

19. The microprocessor as recited in claim 1, wherein each of said plurality of thread contexts further comprises a program counter and general purpose register set for said respective thread.

20. A method for reducing energy consumption by a multithreaded microprocessor, the method comprising:
storing an instruction completion rate in the microprocessor for each of a plurality of threads being concurrently executed thereby, wherein an application comprising the thread requests completion of instructions at said instruction completion rate to accomplish a desired quality-of-service;
operating the microprocessor during a first period at a first frequency and voltage; indicating each clock cycle which of said plurality of threads the microprocessor completed an instruction for; prioritizing said plurality of threads for issuance of instructions to execution units of the microprocessor based on said instruction completion rates and said indicating;
calculating an aggregate utilization of the microprocessor by said plurality of threads during said first period based on said indicating relative to said instruction completion rates;
operating the microprocessor during a second period at a second frequency and voltage based on said calculated aggregate utilization, wherein said second frequency and voltage are different from said first frequency and voltage; and
storing a period in the microprocessor for each of the plurality of threads, wherein said instruction completion rates specify a number of instructions to be completed within said period.

21. The method as recited in claim 20, wherein said period is specified by a number of clock cycles of the microprocessor.

22. The method as recited in claim 21, wherein said calculating said aggregate utilization comprises: generating a sum of a plurality of ratios corresponding to said plurality of threads, wherein each of said plurality of ratios comprises a ratio of an uncompleted number of said number of instructions to be completed specified by said instruction completion rate to a remaining number of said number of clock cycles specified by said period for a respective thread of said plurality of threads.

23. The method as recited in claim 21, wherein said calculating said aggregate utilization comprises: generating a sum of:
(1) for a first of said plurality of threads, a ratio of an uncompleted number of said number of instructions to be completed specified by said instruction completion rate to a remaining number of said number of clock cycles specified by said period; and
(2) for a remainder of said plurality of threads, a product of a scaling factor and a ratio of an uncompleted number of said number of instructions to be completed specified by said instruction completion rate to a remaining number of said number of clock cycles specified by said period for one of said plurality of threads.

24. The method as recited in claim 23, wherein said first of said plurality of threads has an earliest deadline to end said period.

25. The method as recited in claim 23, wherein said scaling factor comprises a value between zero and one.

26. The method as recited in claim 23, further comprising:
storing said scaling factor in a second register of the microprocessor, prior to said calculating said aggregate utilization.

27. The method as recited in claim 23, wherein said scaling factor is software-specifiable.

28. The method as recited in claim 21, wherein said calculating said aggregate utilization comprises:
generating a ratio of a sum of an uncompleted number of said number of instructions to be completed specified by said instruction completion rate for said plurality of threads to a sum of a remaining number of said number of clock cycles specified by said period for said plurality of threads.

29. The method as recited in claim 21, further comprising:
storing a second instruction completion rate in the microprocessor for said plurality of threads, wherein said second instruction completion rate indicates a minimum number of instructions of the thread that the microprocessor may be required to complete in said period to accomplish said desired quality-of-service.

30. The method as recited in claim 29, wherein said calculating said aggregate utilization comprises:
calculating a first utilization beginning with said number of instructions to be completed specified by said first instruction completion rate, for a first portion of said plurality of threads; calculating a second utilization beginning with said number of instructions to be completed specified by said second instruction completion rate, for a second portion of said plurality of threads; and calculating said aggregate utilization as a sum of said first utilization and said second utilization.

31. The method as recited in claim 30, further comprising: determining said first portion of said plurality of threads as having an earliest deadline of said plurality of threads.

32. The method as recited in claim 21, further comprising: calculating an average number of instructions completed by all of said plurality of threads over a third period.

33. The method as recited in claim 32, wherein said calculating said aggregate utilization comprises: calculating a first utilization beginning with said number of instructions to be completed specified by said instruction completion rate, for a first portion of said plurality of threads; calculating a second utilization beginning with said average number of instructions completed, for a second portion of said plurality of threads; and calculating said aggregate utilization as a sum of said first utilization and said second utilization.

34. The method as recited in claim 33, wherein said third period is specified by system software executing on the microprocessor.

35. The method as recited in claim 33, further comprising: determining said second portion of said plurality of threads as having an earliest deadline of said plurality of threads.

36. The method as recited in claim 20, further comprising: selecting said second frequency such that a ratio of said second frequency to a maximum operating frequency of the microprocessor is at least as great as said aggregate utilization.

37. The method as recited in claim 36, further comprising: selecting said second voltage to supply sufficient energy for the microprocessor to operate properly at said second frequency.

38. The method as recited in claim 20, wherein said calculating said aggregate utilization is performed by logic of the microprocessor independent of said execution units that execute said instructions of said plurality of threads.

39. The method as recited in claim 20, wherein said calculating said aggregate utilization is performed by logic of the microprocessor rather than by said instructions of said plurality of threads executed by said execution units.

40. A computing system for operating at reduced energy consumption, comprising:
   a voltage regulator, configured to receive a constant input voltage and to supply a variable voltage output in response to a first control signal;
   a clock divider, configured to receive a constant frequency input clock signal and to supply a variable frequency clock signal output in response to a second control signal; and
   a multithreaded microprocessor, coupled to receive said variable voltage output from said voltage regulator, and coupled to receive and operate at said variable frequency clock signal output, comprising:
      a plurality of thread contexts, each configured to store application-specified quality-of-service (QoS) information for a corresponding plurality of threads concurrently executed by the microprocessor;
      an indicator, for indicating instruction completion information specifying for which of said plurality of thread contexts the microprocessor completed an instruction; a thread scheduler, coupled to said plurality of thread contexts and said indicator, configured to schedule instructions of said plurality of thread contexts to issue to execution units of the microprocessor based on said QoS information and said instruction completion information; and
      a voltage-frequency scheduler, coupled to said plurality of thread contexts and said indicator, configured to determine an aggregate utilization of the microprocessor by said plurality of threads based on said QoS information and said instruction completion information during a first period while generating said first and second control signals to cause said voltage regulator to supply a first voltage on said variable voltage output and to cause said clock divider to supply a first frequency on said variable frequency clock signal output, and to generate said first and second control signals during a second period to cause said voltage regulator to supply a second voltage on said variable voltage output and to cause said clock divider to supply a second frequency on said variable frequency clock signal output, wherein said second frequency and voltage are different from said first frequency and voltage,
   wherein said computing system is integrated onto a single semiconductor substrate.

41. The system as recited in claim 40, further comprising: a memory, coupled to said microprocessor, configured to store instructions of said plurality of threads, coupled to receive said variable voltage output from said voltage regulator, and coupled to receive and operate at said variable frequency clock signal output.

42. The system as recited in claim 41, further comprising: at least one input/output device, coupled to said microprocessor, and coupled to receive said variable voltage output from said voltage regulator, and coupled to receive and operate at said variable frequency clock signal output.

43. The system as recited in claim 40, wherein said logic is configured to generate said second control signal to cause said clock divider to supply said second frequency during said second period such that said second frequency relative to said constant frequency is at least as great as said aggregate utilization.

44. The system as recited in claim 43, wherein said logic is configured to generate said first control signal to cause said voltage regulator to supply said second voltage during said second period such that the system operates properly at said second frequency.

45. A computer-readable storage medium having computer program code recorded thereon that generates a processor, the processor comprising:
   a plurality of thread contexts, each configured to store application-specified quality-of-service (QoS) information for a corresponding plurality of threads concurrently executed by the microprocessor;
   an indicator, for indicating instruction completion information specifying for which of said plurality of thread contexts the microprocessor completed an instruction;
   a thread scheduler, coupled to said plurality of thread contexts and said indicator, configured to schedule instructions of said plurality of thread contexts to issue to execution units of the microprocessor based on said QoS information and said instruction completion information; and
   a voltage-frequency scheduler, coupled to said plurality of thread contexts and said indicator, configured to determine an aggregate utilization of the microprocessor by said plurality of threads based on said QoS information and said instruction completion information during a first period while the microprocessor is operating at a first frequency and voltage, and to cause the microprocessor to operate at a second frequency and voltage during a second period based on said aggregate utilization, wherein said second frequency and voltage are different from said first frequency and voltage, wherein said QoS information comprises a number of instructions to complete over a number of clock cycles to accomplish a required quality-of-service for said corresponding thread.

46. A method for providing a multithreaded microprocessor, the method comprising:

providing computer-readable program code describing the multithreaded microprocessor, the program code comprising:

first program code for providing a plurality of thread contexts, each configured to store application-specified quality-of-service (QoS) information for a corresponding plurality of threads concurrently executed by the microprocessor;

second program code for providing an indicator, for indicating instruction completion information specifying for which of said plurality of thread contexts the microprocessor completed an instruction;

third program code for providing a thread scheduler, coupled to said plurality of thread contexts and said indicator, configured to schedule instructions of said plurality of thread contexts to issue to execution units of the microprocessor based on said QoS information and said instruction completion information; and fourth program code for providing a voltage-frequency scheduler, coupled to said plurality of thread contexts and said indicator, configured to determine an aggregate utilization of the microprocessor by said plurality of threads based on said QoS information and said instruction completion information during a first period while the microprocessor is operating at a first frequency and voltage, and to cause the microprocessor to operate at a second frequency and voltage during a second period based on said aggregate utilization, wherein said second frequency and voltage are different from said first frequency and voltage; and transmitting the computer-readable program code as a computer data signal on a network, wherein said QoS information comprises a number of instructions to complete over a number of clock cycles to accomplish a required quality-of-service for said corresponding thread.

\* \* \* \* \*